2,926,182

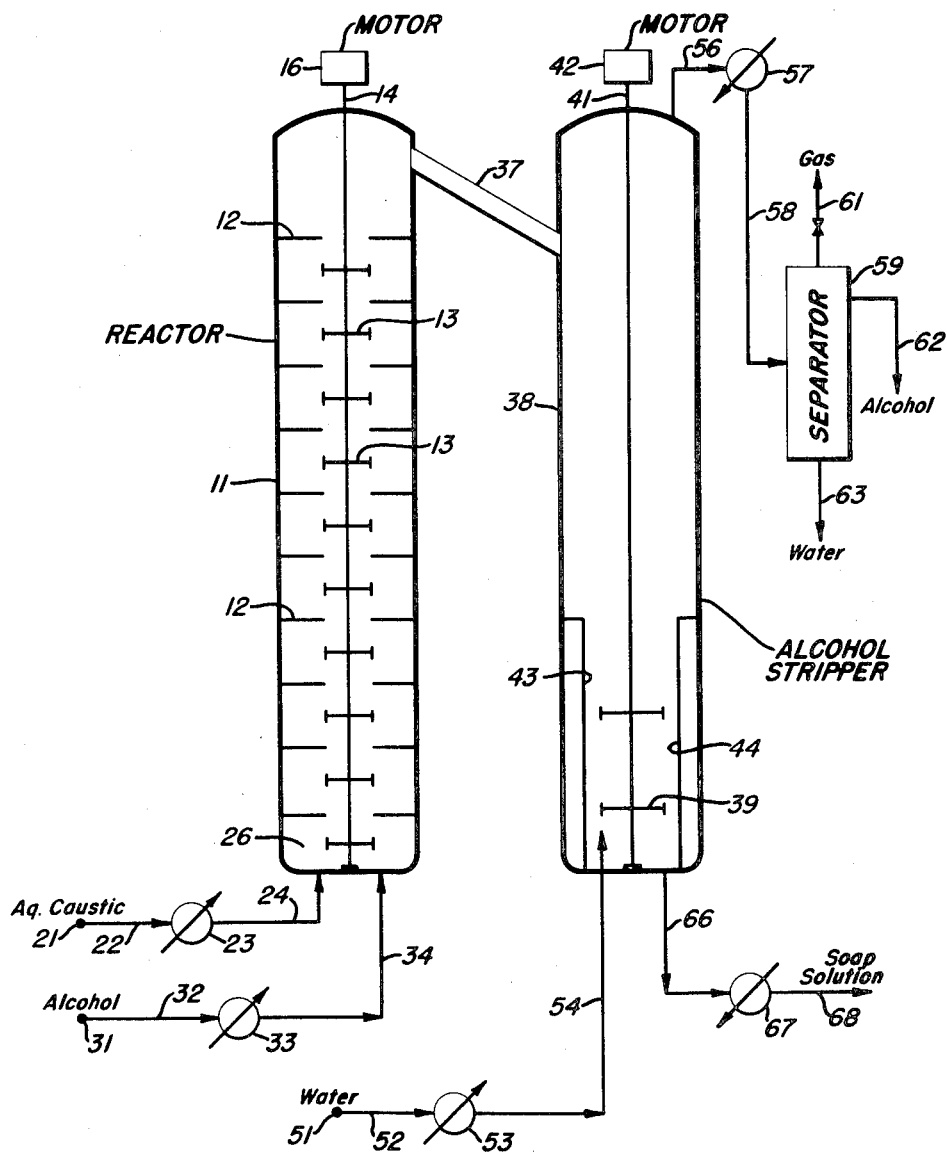

CAUSTIC OXIDATION OF ALCOHOLS

Mack Sutton, Valparaiso, Ind., assignor to Standard Oil Company, Chicago, Ill., a corporation of Indiana Application June 18, 1956, Serial No. 591,993

9 Claims. (Cl. 260—413)

This invention relates to the preparation of aliphatic carboxylic acids from alcohols by caustic oxidation.

In the oxidation of aliphatic alcohols with solid alkali metal hydroxides to produce the corresponding alkali metal carboxylate soap, many difficulties have been encountered by the prior art. A particular difficulty lies in the excess formation of carbonate by-product. A further difficulty is the low yield of product often resulting due to thermal cracking of the feed alcohol. Although the caustic oxidation of alcohols with solid alkali metal hydroxides has been more or less successfully practiced in batch operation, continuous operation has not been considered practical. In the reaction of the alcohol and the alkali metal hydroxide, 2 moles of hydrogen are evolved for each mole of alcohol converted. The evolution of this large volume of gas has introduced complications which have made it difficult to devise a simple continuous oxidation process.

A further difficulty in the caustic oxidation of alcohols has been the presence of aldol condensation as a predominant reaction, particularly in batch operation.

An object of the invention is a process for continuously oxidizing higher molecular weight alcohols with caustic to the corresponding soaps. A particular object is a simple continuous process for producing alkali metal carboxylate soaps in high yield by the reaction of the corresponding aliphatic alcohol and alkali metal hydroxide. Other objects will become apparent in the course of the detailed description.

The invention is described in detail in connection with the annexed figure which forms a part of this specification. It is to be understood that the embodiment shown in the annexed figure merely represents one form of the invention and techniques and apparatus may be readily substituted once the invention has been read by those skilled in the art.

In the figure, the reaction is carried out in reactor 11. Reactor 11 is a vertically positioned vessel which causes the reactants and the reaction products to move upwardly. Reactor 11 is divided into a plurality of communicating reaction zones by means of doughnut baffles 12, etc. Intimate contacting of the stream of materials passing upwardly in reactor 11 is accomplished by providing each zone with a turbine-type stirrer 13 driven by a common shaft 14 which in turn is driven by motor 16. Other means for intimately contacting the reactants and the reaction products to provide an emulsion-like mixture in reactor 11 may be readily devised. It is essential that reactor 11 be provided with means for effecting an intimate contacting of the reactants.

Alkali metal hydroxide is the oxidant in the instant process. The alkali metal hydroxide may be the conventional caustic soda or caustic potash or lithium hydroxide. The oxidation is accomplished by the use of essentially anhydrous alkali metal hydroxide. It has been found that efficient oxidation requires the presence of a small amount of water in the alkali metal hydroxide oxidant; in general, between about 3 and 10 weight percent of water should be present in the alkali metal hydroxide which is actually accomplishing the oxidation.

In the process of this invention, it is not necessary to use alkali metal hydroxide which has been dehydrated to such an extent. The process may use aqueous caustic solutions containing between about 45 and 80 weight percent of the alkali metal hydroxide. When it is desired to maximize the yield of soap from a particular reactor, it is preferred to use an aqueous caustic solution containing between about 65 and 75 weight percent of alkali metal hydroxide.

In this embodiment, aqueous caustic solution containing 70 weight percent of sodium hydroxide is passed from source 21 by way of line 22 into preheater 23. In preheater 23, the aqueous caustic solution is raised to a temperature which is on the order of that maintained in the reaction zone of reactor 11. It is to be understood that the temperature maintained in reactor 11 will vary over the vertical height of the reactor. The oxidation reaction is somewhat exothermic and, therefore, the highest temperature will be in the lowest contacting zone of reactor 11 and the temperature will gradually decrease due to heat loss from the reactor surface as the materials pass upward through reactor 11. In general, the term "reactor temperature" means the average of the temperature existing at the hottest point of the reactor and the temperature in the final contacting zone of the total reaction zone of reactor 11. Although the aqueous caustic solution may be preheated to a temperature substantially below that existing in reactor 11, it is preferred that it be preheated to a temperature which is very close to the same as that existing in reactor 11. The preheated caustic is passed from preheater 23 by way of line 24 into the lowermost portion of reactor 11, herein designated as zone 26.

The aliphatic alcohol from source 31 is passed by way of line 32 into preheater 33 where it is heated to a temperature on the order of that existing in reactor 11. It has been found that at temperatures in excess of 680° F., appreciable amount of thermal decomposition of the alcohol occurs. Therefore, it is preferred that the alcohol be not heated above about 680° F. before introduction by way of line 34 into the lowermost portion of reactor 11, namely zone 26. A suitable range of preheat temperatures is between about 650° and 680° F.

The aliphatic alcohol which is utilized in the instant process contains from about 6 to about 15 carbon atoms. The alcohol may be a single individual compound such as n-hexanol, n-octanol, n-hexadecanol, 2-ethylhexanol, etc. Or, the alcohol may be a mixture of isomers of the same molecular weight or a mixture of alcohols of different molecular weights. Particularly suitable feeds to the process are the so-called oxo alcohols, which alcohols have been produced by the oxoation process wherein carbon monoxide is added to an olefin and the aldehyde hydrogenated to the alcohol, thereby producing an alcohol having one more carbon atom than the original olefin. There are available commercially mixtures of these oxo alcohols derived by oxoation of mixtures of olefin polymers, for example, the commercial iso-octyl alcohol is produced from a mixture of $C_7$ olefins produced by the copolymerization of propylene and butylene. So-called nonyl alcohol is available containing a mixture of $C_9$ alcohols derived by oxoation of butylene homopolymers. Likewise, decyl and tridecyl alcohols are available as mixtures of isomers derived from polymers of olefins made from propylene and butylene. Higher and lower molecular weight alcohols may be used, for example, hexadecyl alcohol produced by oxoation of propylene pentamer or copolymerization of butylene and propylene.

The so-called hydrocarbon synthesis process produces large amounts of oxygen containing organic materials from which alcohols may be separated. These HCS alcohols having from about 6 to about 15 carbon atoms are also suitable for use in the instant claimed process.

In this embodiment, the iso-octyl alcohol prepared by oxoation from a mixture of $C_7$ olefins is utilized as the alcohol feed.

In order to maximize the yield of soap, at least about one mole of alkali metal hydroxide is added to reactor 11 per mole of alcohol added. More than this amount is preferred and, in general, the mole ratio of alkali metal hydroxide to alcohol introduced into the reactor is between about 1.1 and 1.5. In speaking of the alcohol introduced, it is to be understood that the actual alcohol itself is meant. The alcohol introduced by way of line 34 need not be anhydrous and may indeed contain appreciable amounts of water, for example, as much as 10 weight percent. It is preferred, when maximum capacity is desired, to operate with alcohol which is substantially anhydrous.

The preheated aqueous caustic solution from line 24 and the preheated alcohol from line 34 are introduced into the lowermost portion of the reactor 11, namely zone 26. The two streams are immediately commingled by the contacting means provided. As the reaction does not begin until the water content of the combined streams has been reduced to substantially anhydrous condition, the pressure in reactor 11 is maintained at such a point that at the particular reaction temperature water is rapidly vaporized and removed upwards away from the initial contacting zone. The pressure is so adjusted so that the water content, based on alkali metal hydroxide present, is between about 3 and 10 weight percent. When operating in the temperature range of about 650° F. to about 740° F. it has been found that a pressure of between about 150 and 250 p.s.i.a. will permit high yields of soap to be formed.

Reactor 11 is maintained at a temperature between about 650° F. and 740° F. The lower the temperature, the less conversion at a particular space velocity. In order to maximize once through conversion, it is preferred to operate at a temperature between about 680° F. and 710° F. with the aqueous caustic solution preheated to the reactor temperature and the alcohol preheated to about 680° F. At the preferred temperature and the preferred aqueous caustic solution concentration, extremely high yields of soap are obtained by maintaining the pressure in reactor 11 at about 200 p.s.i.a.

In addition to the intimate intermingling of the reactants and the reaction products, the yield of alcohol is greatly influenced by the residence time within reactor 11. For convenience in computation, this residence time is spoken of as the volume of alcohol/volume of reaction zone/hour; in other words, space velocity has a great bearing on the yield of soap. In the process, reactor 11 is operated in such a way that the space velocity is between about 0.3 and 0.6 and preferably between 0.4 and 0.5.

It is believed that there exists within reactor 11 an emulsion type mass consisting of hydrogen reaction product, water vapor and alcohol vapor forming the discontinuous phase. The continuous phase or film consists of the unreacted alkali metal hydroxide, product alkali metal carboxylate soap, and minor amounts of decomposition products. When the pressure and agitation and particularly temperature and space velocity are properly coordinated, the emulsion-like mass flows upwards through reactor 11 and out through conduit 37 without apparent separation of the gas from the solid and liquid components of the mixture. While the exact amount of alcohol conversion to corresponding soap will be dependent upon the type of alcohol present, the reactor temperature and space velocity, in general, the one pass conversion of alcohol will be between about 80 and 92%. This conversion represents almost entirely alcohol going to the corresponding acid in the form of soap with almost negligible amount of decomposition products, such as carbonates and non-condensable gases.

An intimate mixture of hydrogen, water vapor, unreacted alcohol, unreacted alkali metal hydroxide and product alkali metal carboxylates is continuously withdrawn from an upper portion of reactor 11 by way of conduit 37 and is passed to alcohol stripper 38. Alcohol stripper 38 is a vertical vessel having dimensions about that of reactor 11. Stripper 38 is provided with turbine stirrers 39, etc. positioned at the lower end of the vessel, which turbines are driven by shaft 41 and motor 42. To assist agitation in stripper 38, vertical baffles 43, 44, etc. are positioned at the periphery of the stripper.

The unreacted alcohol is stripped from the product alkali metal hydroxide in stripper 38 by a steam distillation operation. Water from source 51 is passed by way of line 52 through preheater 53 and line 54 into the bottom portion of stripper 38. Alcohol stripper 38 is operated under a pressure such that essentially steam passes out of line 54 and up through the agitated contents of stripper 38 to boil off unreacted alcohol. In general, stripper 38 is operated at a temperature between about 375° F. and about 425° F. at a pressure between about 150 and 250 p.s.i.a. particularly on the order of 200 p.s.i.a. For convenience, it is customary to operate stripper 38 and reactor 11 at the same pressure as effected by pressure drop within the individual vessels. However, these two vessels may be operated at different pressures by placing a valve in line 37.

The amount of water in the form of vapor introduced into the bottom of stripper 38 is sufficient to essentially remove all the unreacted alcohol overhead from the stripper. The amount of steam needed will be dependent upon the conversion attained in reactor 11 and the type of alcohol charged as well as the pressure in stripper 38. With the low boiling alcohols, enough steam is generated in the forming of the aqueous solution of product alkali metal carboxylate soap and separation of the non-condensable gases to obtain the desired removal of alcohol from the product soap. It has been found that when the conversion is on the order of 85 or more percent of the alcohol charged that essentially alcohol-free product is obtained by using up to about 2 lbs. of steam per lb. of alkali metal carboxylate soap entering stripper 38. When operating with oxo alcohols in the $C_8$ to $C_{13}$ carbon atom range, satisfactory alcohol-free product soap is usually attained by using between about 1 and 1.5 lbs. of steam per lb. of soap entering the stripper 38.

In addition to removing alcohol from the soap product, stripper 38 functions as a gas separator in the sense that the non-condensable gases are passed along with the water vapor and alcohol vapors out of separator 38 at the uppermost point thereby by way of line 56. From line 56, the gas and vapors are passed through cooler 57 wherein the alcohol and water vapors are condensed. From cooler 57, materials are passed by way of line 58 into separator 59. Separator 59 is adapted to permit venting of the hydrogen and other gases formed in the reaction by way of line 61 which is provided with a throttling valve. This gas is essentially pure hydrogen and may be used for any operation which requires hydrogen, particularly high purity hydrogen. These alcohols are relatively low in solubility in water so that two layers are formed in separator 59, the upper alcohol layer saturated with water, which is withdrawn by way of line 62 and a lower water layer, which is withdrawn by way of line 63. Alcohol from line 62 is recycled to the reactor by way of line 32. The presence of the few percent of water contained in the alcohol has no deleterious effect on the yield and capacity obtained in reactor 11 when the alcohol recycle is admixed with fresh alcohol feed. In order to conserve the alcohol dissolved in the water phase, water stream from line 63 is recycled to line 52 for reuse in alcohol stripper 38.

In addition to the gas separation and alcohol removal function of stripper 38, stripper 38 is used to form an aqueous solution of the product alkali metal carboxylate. Thus sufficient water is introduced by way of line 54 not only to carry out the steam stripping, but also dissolve the product soap and form a soap solution which may be readily handled at ambient temperatures. When operating with the oxo alcohols, it has been found desirable to add sufficient water to form a soap solution containing between about 30 weight percent soap in the case of $C_{13}$ alcohols, and 45 weight percent soap in the case of the $C_8$ alcohols. The water solution of soap is withdrawn from stripper 38 by way of line 66 and is passed through cooler 67 to reduce the pressure to atmospheric and also reduce the temperature to atmosperic, i.e., 60 to 90° F. The cooled soap solution is withdrawn and passed to storage by way of line 68.

In general, the alkali metal carboxylate soap (essentially free of water) consists of 90 to 95 weight percent of soap, between 0.5 and 2 weight percent of sodium carbonate, trace amounts of unreacted alcohol and the remainder alkali metal hydroxide. When operating very close to the theoretical requirement of alkali metal hydroxide, product soaps containing on the order of 1% of free-sodium hydroxide are obtained. In general, the sodium carbonate content of the product soap does not exceed about 1%.

The results obtainable with the process of the invention are illustrated by the following runs. These runs were carried out in a pilot size unit in general resembling that depicted in the annexed figure. The pilot size unit was provided with a vertical reactor 6 inches in internal diameter and 36 inches overall height. Nine doughnut baffles were positioned in the reactor leaving a disengaging space above the last baffle of approximately 8 inches. Between the doughnut baffles nine 2 inch turbines were positioned driven by a common shaft extending through the vertical axis of the reactor and terminating in an air-driven motor. This motor was of such size that during the actual operation of the reactor, the turbine turned at 400 r.p.m. Provisions were made for preheating aqueous caustic solution and for preheating alcohol and introducing these separately into the very bottom of the reactor almost below the lowermost turbine. The pilot reactor provided 3.4 gallons of reaction zone with the total volume of the reactor being 4.1 gallons. The alcohol stripper was made of the same size as the reactor and differed only in the internal arrangement. Four vertical baffles extending 1 inch into the interior of the vessel from the wall and extending from the bottom for a distance of approximately 12 inches were positioned within the reactor. Two turbines driven by a common shaft at 400 r.p.m. during actual operation of the stripper were positioned within the baffled area at the bottom of the stripper. Provisions were made to introduce steam into the bottom of the alcohol separator in order to attain the desired alcohol removal and solution of the product soap. The gas and vapor was withdrawn overhead from the alcohol separator through a condensor and into a gas-liquid separator. The non-condensable gases were withdrawn from the separator and measured. Alcohol layer and water layer were withdrawn separately from the separator to storage tanks for reuse in the process. The aqueous soap solution was withdrawn from the bottom of the separator through a product cooler and passed into a storage tank.

The pilot unit was run continuously for from about 6 hours on a particular charge up to a maximum of about 1000 hours on a particular alcohol charge. In Table I, there are set out the inspection data on the particular alcohols which were charged to the unit. These alcohols were commercial materials known to be derived by the oxo process from petroleum olefins. When the commercial product was charged, it is designated as "fresh" alcohol. In order to determine the feasibility of recycle, the alcohol recovered in the separator was accumulated in the case of isooctyl alcohol and nonyl alcohol and rerun. These recycle alcohols were designated as "first recycle." Very short runs were also made on second recycle as well as first and second recycle on decyl and tridecyl alcohols. These runs proved the feasibility of total recycle but are not reported due to the brevity of the individual runs.

TABLE I

*Inspection data on alcohols* [1]

|  | Iso-Octyl Alcohol | | Nonyl Alcohol | | Decyl Alcohol— Fresh | Tridecyl Alcohol— Fresh |
|---|---|---|---|---|---|---|
|  | Fresh | First Recycle | Fresh | First Recycle | | |
| Water, Vol. Percent | Trace | 3.2 | 0.05 | 2.8 | Trace | 0.13 |
| Refractive Index $n_D^{20}$ | 1.4305 | 1.4300 | 1.4330 | 1.4332 | 1.3997 | 1.4489 |
| Specific Gravity | 0.833 | 0.835 | 0.831 | 0.819 | 0.833 | 0.848 |
| Color, Saybolt | +30 | +24 | +27 | +25 | +27 | +21 |
| ASTM Distillation, ° F.: | | | | | | |
| Initial | 358 | 202 | 375 | 365 | 418 | 486 |
| 10% | 362 | 357 | 377 | 374 | 420 | 491 |
| 30% | 364 | 361 | 378 | 378 | 421 | 493 |
| 50% | 365 | 363 | 378 | 378 | 423 | 496 |
| 70% | 367 | 367 | 378 | 380 | 424 | 498 |
| 90% | 370 | 378 | 379 | 386 | 426 | 514 |
| Max | 379 | 500 | 385 | 422 | 452 | 549 |
| Viscosity, Centistokes: | | | | | | |
| 68° F | 12.3 | 10.9 | 17.4 | 15.3 | 21.2 | 49.9 |
| 100° F | 6.3 | 5.8 | 8.6 | 7.6 | 10.0 | 20.4 |
| 210° F | 1.4 | 1.3 | 1.6 | 1.6 | 1.3 | 2.7 |

[1] Tests other than for water were run on water-free samples.

In Table II, there is set out four runs utilizing either fresh iso-octyl alcohol as the feed or first recycle as the feed. Although attempts were made to control accurately the alcohol feed rate, in the shorter runs there was some difficulty in obtaining this uniformity and the alcohol feed rate varied largely from 8–10 lbs. per hour. In the very long run, B, the average alcohol feed rate was 9.4 lbs. per hour. The alcohol preheat temperature was controlled to about the maximum which did not cause considerable decomposition of the alcohol. In operating at 710° alcohol preheat, it was noticed that the non-condensable gases from the reaction consisted of about 97.5 to 98.5% hydrogen and the remainder carbonaceous materials obviously derived by cracking of the alkyl portion of the alcohol.

In all cases, the aqueous caustic was preheated very close to the reaction temperature. The alcohol stripper temperature was operated at about the same temperature, regardless of the reaction temperature and both reactor and stripper were operated at about 210 p.s.i.a.

Runs A and B differed only in the reactor temperature which represents an arithmetic average between the temperature in the last agitated zone and in the first agitated zone. The results show that operation at the higher temperature resulted in an appreciable improvement in the once through alcohol conversion yield. Run C was carried out with aqueous caustic solution such as is readily available commercially in tank car lots containing 48 weight percent of sodium hydroxide. This short run indicates that this high water content aqueous caustic solution can be used successfully with very little penalty on once through yield of soap.

These runs, in the continuous pilot unit, show that by operating at the claimed conditions, it is possible to substantially completely convert alcohol in one phase through a very simple reaction system and to recover the product alkali metal carboxylate in essentially pure form in aqueous solution. Essentially no loss of alcohol to undesired carbonates is incurred in this process.

TABLE III

| Run No. | E | F | G | H |
|---|---|---|---|---|
| Run Length, hrs. | 10 | 6 | 16 | 16 |
| Alcohol Type | Nonyl—Fresh | Nonyl—First Recycle | Decyl—Fresh | Tridecyl—Fresh |
| Feed Rate, lbs./hr.: | | | | |
| Alcohol | 11.0 | 9.3 | 11.9 | 12.3 |
| Caustic Solution | 3.9 | 3.9 | 3.9 | 3.9 |
| Caustic Concentration, Wt. Percent | 74 | 73 | 73 | 74 |
| Temperature, °F.: | | | | |
| Preheated Alcohol | 605 | 630 | 645 | 650 |
| Preheated Caustic | 605 | 635 | 655 | 650 |
| Reactor, Average over height | 615 | 670 | 700 | 710 |
| NaOH/Alcohol, mole ratio | 0.95 | 1.10 | 0.96 | 1.16 |
| Vol. Alcohol/Reactor Vol./Hr | 0.47 | 0.40 | 0.50 | 0.51 |
| Reactor Pressure, p.s.i.a | 210 | 210 | 210 | 210 |
| Alcohol Stripper Operation: | | | | |
| Pressure, p.s.i.a. | 210 | 210 | 210 | 210 |
| Temperature, °F | 405 | 410 | 405 | 400 |
| Water added, lbs./hr | 39 | 31 | 34 | 48 |
| Alcohol Conversion to Soap, Percent | 60 | 92 | 89 | 92 |

In Table IV, there are set out data on the aqueous soap solutions obtained by the process described herein, giving specific gravity and viscosities at the common temperatures. These data are presented since these alkali metal carboxylate soaps are generally used in the form of aqueous solutions in particular reactions, for example, the formation of aluminum soaps for use in grease manufacture, or in paint formulations.

TABLE II

*Iso-octyl alcohol feed*

General operating conditions:
Alcohol feed rate, lbs./hr. _____ 8-10
Alcohol preheat temperature, °F. _____ 670-680
Caustic preheat temperature, °F. _____ 670-710
Alcohol stripper temperature, °F. _____ 400-430
Reactor and stripper pressures, p.s.i.a. _____ 210

| Run No. | A | B | C | D |
|---|---|---|---|---|
| Run Length, hours | 121 | 722 | 48 | 17 |
| Alcohol, type | Fresh | Fresh | Fresh | 1st Recycle |
| Caustic Concentration, wt. percent | 73 | 73 | 48 | 73 |
| NaOH/Alcohol, mole ratio | 1.17 | 1.15 | 1.6 | 1.24 |
| Reactor Temperature, °F | 675 | 722 | 712 | 720 |
| Alcohol Conversion, percent | 88 | 92 | 88 | 80 |

Run D, carried out on first recycle alcohol, indicates that this alcohol may be successfully used as such but it is preferable to dilute it with fresh alcohol because it appears that the impurities contained in the fresh alcohol accumulate in the recycle and have some adverse effect on convertability of the recycle alcohols.

In Table III, there are set out runs on nonyl, decyl, and tridecyl alcohols. Run E, which was carried out at the low temperature of 615° F., had an alcohol conversion of only 60%. Run F, on first recycle of nonyl alcohol, which was carried out at slightly higher NaOH-alcohol ratio and at a temperature of 670°, had an alcohol conversion of 92%. These two run show the critical importance of the reactor temperature in obtaining very high alcohol conversions; these two runs are particularly significant since the data set out in Run D, Table II, shows that recycle alcohol does not have as high a convertability as fresh alcohol.

Run G, carried out with fresh decyl alcohol at 700° F. reactor temperatures, produced an alcohol conversion of 89%. Run H, carried out with fresh tridecyl alcohol at 710° reactor temperature, produced an alcohol conversion of 92%.

TABLE IV

*Viscosity of soap solutions at 100° F. and 130° F.*

| Sodium Soap | Conc., Percent | Sp. Gr. 77° F. | Centistokes 100° F. | Centistokes 130° F. |
|---|---|---|---|---|
| Iso-Octanoate | 47 | 1.085 | 62.9 | 26.6 |
| | 35 | 1.072 | 12.0 | 7.0 |
| | 20 | 1.046 | 2.60 | 1.92 |
| Nonanoate | 40 | 1.077 | 21.8 | 11.8 |
| | 30 | 1.061 | 7.2 | 6.3 |
| | 20 | 1.045 | 2.64 | 1.85 |
| Decanoate | 43 | 1.061 | 55.7 | 24.6 |
| | 30 | 1.046 | 9.1 | 5.8 |
| | 20 | 1.032 | 3.0 | 2.09 |
| Tridecanoate | 33 | 1.034 | 48.2 | 22.1 |
| | 20 | 1.022 | 4.4 | 3.4 |
| | 10 | 1.012 | 1.28 | 1.04 |

The above working examples clearly show that applicant has accomplished his objection of obtaining a simple continuous caustic oxidation process of higher boiling aliphatic alcohols which permits substantially complete conversion of the alcohols in one phase with essentially no loss of alcohol due to thermal cracking or to carbonate formation.

Thus having described the invention, what is claimed is:

1. A process for the continuous oxidation of aliphatic alcohols, having from about 6 to about 15 carbon atoms, to the corresponding alkali metal carboxylate soap, which process comprises (1) continuously and separately adding to the lowermost portion of a vertical reaction zone (a) said alcohol, preheated to a temperature on the order of the reaction zone temperature, and (b) aqueous alkali metal hydroxide solution, containing between about 45 and 80 weight percent of alkali metal hydroxide, preheated to a temperature on the order of the reaction zone temperature, the mole ratio of alkali metal hydroxide added to alcohol added being at least about 1, (2) immediately commingling said alcohol and said solution, said reaction zone being maintained (i) at a temperature between about 650° F. and about 740° F., and (ii) at a pressure between 150 p.s.i.a. and about 250 p.s.i.a., so that the water content of the said alkali metal hydroxide solution is reduced to between about 3 and 10 weight percent, whereby there is formed in the lower portion of said reaction zone an emulsion-like mass composed of gaseous, liquid and solid components contributed from said alcohol, said solution, product soap and other reaction products, (3) intimately contacting the reactants and reaction products in said mass while passing said mass, at a space velocity, volume of alcohol/volume of reaction zone/hour, of between about 0.3 and 0.6, upwardly through said reaction zone without apparent separation of gaseous from said other components, (4) continuously withdrawing emulsion-like mass from the upper portion of said reaction zone and (5) passing said withdrawn mass to a separation zone, maintained at substantially the same pressure as said reaction zone, wherein gaseous components are separated from product soap and said other components.

2. The process of claim 1 wherein said alcohol is iso octyl alcohol.

3. The process of claim 1 wherein said alcohol is tri-decyl alcohol.

4. The process of claim 1 wherein said alcohol is hexyl alcohol.

5. The process of claim 1 wherein said alkali metal hydroxide is sodium hydroxide.

6. The process of claim 1 wherein the mole ratio of alkali metal hydroxide to alcohol is between about 1. and 1.5.

7. The process of claim 1 wherein said reaction zone is maintained at a temperature between about 680° F. and 710° F. and a pressure of about 200 p.s.i.a. and said alcohol is preheated to a temperature of about 680° F.

8. The process of claim 1 wherein said aqueous alkali metal hydroxide solution contains between about 65 and 75 weight percent of alkali metal hydroxide.

9. The process of claim 1 wherein said separation zone is maintained at a temperature between about 375° F. and 425° F. and steam is introduced into said separation zone in an amount at least sufficient to strip off unreacted alcohol, which steam and alcohol vapors are passed off along with said separated gaseous components, and to form an aqueous solution of product soap.

References Cited in the file of this patent

UNITED STATES PATENTS

| | | |
|---|---|---|
| 1,926,068 | Strosacker et al. | Sept. 12, 1933 |
| 2,384,817 | Chitwood | Sept. 18, 1945 |
| 2,727,050 | Sutton | Dec. 13, 1955 |
| 2,766,267 | Hill | Oct. 9, 1956 |